United States Patent [19]

Kokubo et al.

[11] Patent Number: 4,896,318
[45] Date of Patent: Jan. 23, 1990

[54] METHOD FOR CANCELLING ECHO IN A TRANSMITTER AND AN APPARATUS THEREFOR

[75] Inventors: Masaru Kokubo, Fuchu; Tatsuko Shinotsuka, Stuffgart; Tatsuya Kameyama, Hachioji; Motohiro Kokumai, Yokohama; Hirotaka Hara, Kokubunji, all of Japan

[73] Assignee: Hitachi, Ltd., Tokyo, Japan

[21] Appl. No.: 271,673

[22] Filed: Nov. 16, 1988

[30] Foreign Application Priority Data

Nov. 18, 1987 [JP] Japan .................................. 62-289320
Jun. 24, 1988 [JP] Japan .................................. 63-154692

[51] Int. Cl.$^4$ ............................................. H04B 3/23
[52] U.S. Cl. ..................................... 370/32.1; 379/410
[58] Field of Search ...................... 370/32, 32.1; 375/8; 379/406, 410, 411

[56] References Cited

U.S. PATENT DOCUMENTS 4,682,358  7/1987  Werner ................................ 379/411
4,695,998  9/1987  Schollmeier et al. ............... 370/32.1

FOREIGN PATENT DOCUMENTS 0192359  8/1986  European Pat. Off. ............ 379/411
0261476  3/1988  European Pat. Off. .

OTHER PUBLICATIONS

"Asynchronous and Timing Jitter Insensitive Data Echo Cancellation", D. Messerschmitt, IEEE Transactions on Communications, vol. COM-34, No. 12, 12-1986.
"An Echo Canceller LSI for ISDN Subscriber Loop Transmission", M Fukuda, IEEE International Conference on Comm. 1987, Seattle 7th, 10th Jun. 1987.
"Digital Subscriber Loop Transmission System for ISDN Based on Echo Cancellation Techniques", Koike et al, 298 NEC Research & Development, Jul. 1986, No. 82, pp. 83–95.
"Design Issues in the ISDN U–Interface Transceiver", D. Messerschmitt, IEEE Journal on Selected Areas in Communication SAC-4, No. 8, Nov. 1986, pp. 1281–1293.

Primary Examiner—Jin F. Ng
Assistant Examiner—Randall S. Vaas
Attorney, Agent, or Firm—Antonelli, Terry & Wands

[57] ABSTRACT

A method for cancelling an echo in a network termination (NT) of a transmission system and an apparatus therefor are disclosed. The method comprises the steps of detecting an end of transmission of a specific data train in an up-going signal when the phase of the received clock is to be shifted for synchronization during the transmission of the up-going signal from the NT, shifting the phase of the receiving clock when the end of transmission is detected, sampling a residual echo signal of the echo of the specific data train not cancelled by the adaptive filter, determining a correction value for the output of the adaptive filter and storing the correction value and adding a sign corresponding to the direction of the phase shift to the correction value after the phase shift and adding the result to the output of the adaptive filter to cancel the echo of the specific data train.

25 Claims, 9 Drawing Sheets

| | ADVANCE DIRECTION | NO CONTROL | RETARD DIRECTION |
|---|---|---|---|
| ACTIVATION SIGNAL (PO) | 1 | 0 | 1 |
| PHASE SHIFT DIRECTION SIGNAL (SM) | 0 | * | 1 |
| BINARY NOTATION | 11 | 00 | 01 |

( * DONT CARE )

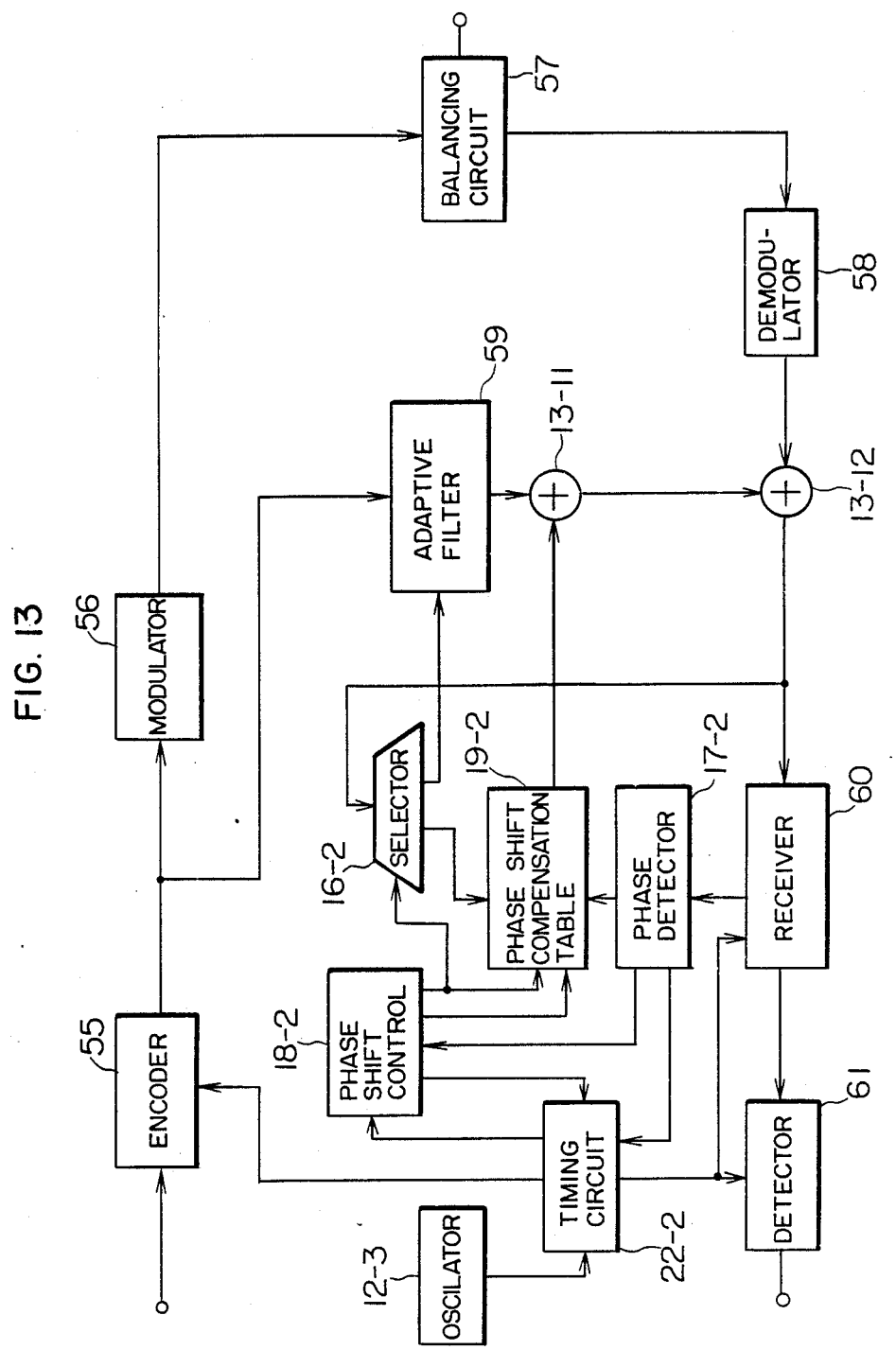

METHOD FOR CANCELLING ECHO IN A TRANSMITTER AND AN APPARATUS THEREFOR

BACKGROUND OF THE INVENTION

The present invention relates to a communication system, and more particularly to an echo canceller suitable for a subscriber line digital transmitter in an ISDN (integrated services digital network).

A subscriber digital transmitter usually comprises two units, a line termination (LT) at a switching station and a network termination (NT) at a terminal a signal (down-going signal transmitted from LT to NT) and a signal (up-going signal) transmitted from NT to LT are separated by balancing circuits provided in the terminations of LT and NT. As to the down-going signal from LT to NT, a waveform is deformed at an input point of NT because of high-frequency attenuation characteristic of the line. Accordingly, an inter symbol interference (ISI) occurs so that waveforms of adjacent ones of sequentially transmitted signals overlap.

Further, because of impedance mismatching between the line and the balancing circuit, the up-going signal and the down-going signal are not perfectly separated and an echo signal component appears so that a portion of the up-going signal is combined with the down-going signal. Accordingly, NT comprises a circuit for eliminating the intersymbol interference component and an echo canceller which generates a quasi-echo signal for cancelling the echo signal.

In NT, a received clock is generated by a PLL (phase locked loop) in order to synchronize with a timing of the transmitted data. The phase shifting of received clock is effected by momentarily switching a frequency division ratio of a master clock. For example, three different frequency division ratios 1/(A-1), 1/A and 1/(A+1) (where A is a positive integer) are prepared. Normally, synchronization is effected at 1/A. Because of a problem due to precision of the master clock, the phase of the received clock in NT always fluctuates to the transmission timing of LT. If the synchronization between LT and NT deviates beyond a predetermined range, the frequency division ratio is switched to 1/(A+1) or 1/(A-1) for one clock generation period to correct the deviated phase so that the clock is synchronized with the transmission timing of LT. From the second clock, the transmission clock is generated at the original frequency division ratio 1/A. When the phase of the received clock is momentarily shifted for synchronization, the phase of the transmitted clock used when data is transmitted from NT is also shifted. The echo canceller of NT samples the received signal from LT on which the echo has been overlapped by the signal transmitted by NT, at rising edges of the received clock and generates quasi-echo signal of the opposite polarity for cancelling the echo, based on the transmitted signal.

In the following description, the phase shifting means to momentarily switch the frequency division ratio to a different ratio for only one clock generation period for synchronization, and the phase shift means phase shifted status. As the phase of the received clock shifts, a sampling position of the received signal shifts. Thus, a tap coefficient (rewritable constant) for generating a cancel signal which the echo canceller has had before the phase shift is no longer proper and it should be corrected to a value which permits perfect cancellation of the echo in accordance with the phase shift.

The echo canceller usually has several tens of (for example, 50) taps (sampling points for the echo signal) so that it can cancel as many echos due to the transmitted signal as the number of taps. If the transmission/reception clock is always constant, the echo can be cancelled by one tap coefficient, but if the clock of different period is used for only one clock generation period, the sampling point is shifted and hence the tap coefficient should be corrected.

An echo canceller in full duplex transmission in a subscriber line digital transmitter is disclosed in JP-A-61-256833 filed on Jan. 29, 1986 by British Telecommunications Public Limited Co. It uses an adaptive filter having a tap coefficient correction function for phase shift of sampling timing of an echo signal to be cancelled. The adaptive filter comprises a plurality of cascade-connected delay circuits to which voltage levels of the transmitted signals are applied. An output stage of each delay circuit has a multiplier for multiplying a predetermined value called a tap coefficient to a delay circuit output $a_i$, and a memory for storing the tap coefficient $\alpha_i$. A sum $$X_{out} = \sum_{i=0}^{S-1} \alpha_i \cdot a_i$$

of products $a_i \cdot \alpha_i$ of the delay circuit output $a_i$ and the tap coefficient $\alpha_i$ is calculated as an echo cancelling signal to cancel the echo signal, where S is the number of taps. In case a phase shift of a received clock occurs, an adaptive feedback loop for correcting the tap coefficients to optimum values based on a difference (residual echo signal) between the quasi-echo signal and the actual echo signal is also provided.

In the correction of the tap coefficient disclosed in the JP-A-61-256833, a product of the residual echo signal, the phase shift direction and the amount of phase shift are integrated to determine a primary term of a Taylor approximation of the echo signal, the phase shift direction and the amount of phase shift are multiplied to the primary term of the Taylor approximation to determined a tap coefficient correction $y_i$, and it is added to the tap coefficient of the adoptive filter to determine a new tap coefficient $\alpha_i' = \alpha_i + y_i$. As a result, a new quasi-echo signal $$X_{out} = \sum_{i=0}^{S-1} \alpha_i' \cdot a_i$$

is produced. Each time the phase of the receive clock is shifted, the new tap coefficient is determined by calculation. In this system, because of large amount of processing, a large capacity memory is required. Further, since the calculation of the primary term of the Taylor approximation includes noise components such as residual echo signal because of limited tap numbers of the echo canceller near end crosstalk from adjacent lines, a correct $y_i$ cannot be produced and a convergence time of the echo canceller increases.

SUMMARY OF THE INVENTION

It is an object of the present invention to attain an echo cancelling characteristic which compensates for a shift of a received clock for sampling an echo signal is shifted by phase control of PLL, with a small hardware amount and without increasing a convergence time to cancel the echo signal.

In order to achieve the above object, in accordance with the present invention, an echo canceller at an NT is provided with a phase shift compensation table, a phase shift control circuit, and an adder for adding an adaptive filter output and a phase shift compensation table output.

The adaptive filter cancels the echo when no phase shift occurs, and the phase shift compensation table suppresses an echo component which cannot be suppressed by the adaptive filter because of the phase shift, by adding a correction value to the output of the adaptive filter.

An LT transmission clock and an NT received clock are not always perfectly synchronized but there always be a slight relative shift therebetween, and the phase shift is always detected by a phase detector. In the present invention, in order to compensate for the phase shift, the timing to shift the phase of the received clock is limited to immediately after the transmission of a specific data train which is always checked in a frame which is a communication unit consisting of a plurality of data trains when data is transmitted from NT. In the embodiment according to the present invention, a synchronization pattern for nine data trains which exists at the beginning of the frame is used as the specific data train.

If the phase of the received clock is controlled immediately after the transmission of the synchronization pattern, a sampling period between ninth and tenth received clocks of the echo signal of the synchronization pattern sent before the phase control is $T - \Delta\tau$ when the phase is advanced, and $T + \Delta\tau$ when the phase is retarded, where $\Delta\tau$ is the phase shift. Since the period for the tenth and subsequent received clocks returns to T, the sampling period of the echo signal by the transmitted data after the synchronization pattern is T. The echo signal detected in the sampling period T can be cancelled by the adaptive filter, but the echo of the synchronization pattern transmitted before the phase shift is detected in the sampling period $T \pm \Delta\tau$. Accordingly, it cannot be suppressed by the adaptive filter which is adapted to the sampling period T. Thus, for the echo signal detected in the sampling period $T \pm \Delta\tau$, the phase shift compensation table is activated to add a correction value to the echo cancelling signal from the adaptive filter in order to suppress the residual non-suppressed echo signal component.

Thus, the phase compensation table initially stores the residual echo signal (echo signal-quasi-echo signal from the adaptive filter - correction value) of the synchronization pattern sampled in $T \pm \Delta\tau$. Initially, the correction value is zero. The stored data does not include a component to indicate the direction of phase shift but it indicates only the amount of correction. A basic amount of correction is the same irrespective of the advancement or retardation of the phase shift. Further correction is done only when the amount of phase shift is large.

In the present invention, all amplitude information of the residual echo signal are not stored in one sampling, but a fraction of the detected residual echo signal is stored for the one transmission of the synchronization pattern, and necessary amount of correction is determined from information on the residual echo signals produced by several times of phase shifts during the continued communication. This period is called a training period. After the training period, the echo cancelling function may be fully attained The correction output is the amount of correction stored in the table with a sign determined by the direction of phase shift.

A phase control request signal from the phase detector and a transmission data train are supplied to the phase shift control circuit. If the transmission data train matches to the specific data train (synchronization pattern in the present invention), an activation signal and an address signal of the memory at which the correction value is stored are supplied to the phase shift compensation table. If the matching with the specific data train is detected, a frequency division ratio of a variable frequency divider for a master clock is changed so that the phases of the NT transmission clock and received clock are controlled. The frequency division ratio is 1/A if the phase is not to be shifted, 1/(A-1) if the phase is to be advanced, and 1/(A+1) if the phase is to be retarded.

The phase detector detects a phase of the received clock which enables the identification of the received signal such as $\pm 1$ V or $\pm 3$ V by using data near a maximum amplitude of the received signal. The received signal is sampled at the rise of the received clock. At an optimum phase, it is said that eye-open is assured. In the detection, a difference between precursor at one clock earlier $(t_0 - T)$ and Postcursor at one clock later $(t_0 + T)$ of the received clock in which intersymbol interference exists but no echo exists when no transmission from NT is done, is determined, where $t_0$ is a sampling point of the received signal and T is a period of the receiving clock. Thereafter, high-frequency component is eliminated to eliminate a noise. If the precursor is small, the phase of the receiving clock is retarded so that the the amplitude of the received signal at $t_0$ becomes maximum. If it is large, the phase is advanced. The phase is shifted such that a difference between the both interference components becomes zero. To this end, a phase control request signal and a phase shift direction signal are produced.

The operation of the echo canceller of the present invention is now explained.

The echo signal is represented by Ei, the adaptive filter output is represented by Yi, and the correction value determined in accordance with the present invention is represented by Xi, where i is a sampling point. The frequency divider has three frequency division ratios 1/A, 1/(A+1) and 1/(A-1), where A is a positive integer.

①An actuation signal is required from NT or LT.

②NT sends a transmittion signal to LT, samples the echo and determines tap coefficients of the adaptive filter. The frequency division ratio is 1/A.

③After the training period of the adaptive filter, LT requests a down-going signal. The output of the adaptive filter is represented by Yi.

④ The receiving clock is synchronized to the transmitted signal from LT. The phase shift is done by the PLL. It is done at any time point when the phase shift is detected. Only one clock is generated at the frequency division ratio of 1/(A+1) or 1/(A-1). The receiving clock after the phase shift is phased such that a maximum amplitude of the received signal appears at the rise of the receiving clock. The eye-open is assured and the optimum phase is attained.

⑤ While the transmission from NT continues, NT sends data at the frequency division ratio of 1/A. A relative phase between LT and NT gradually shifts so that synchronization is required due to the phase shift.

⑥ After the synchronization pattern has been sent from NT, the phase of the receiving clock is shifted by $\Delta\tau$ at the frequency division ratio of $1/(A+1)$. Thus, if the first receiving clock is defined at the beginning of sending the synchronization pattern, the period is $T+\Delta\tau$ only between the ninth and tenth receiving clocks, which ninth receiving clock represents the finish of sending the characterization pattern. If it is viewed from the ninth receiving clock, the phases of the tenth and subsequent clocks are retarded by $\Delta\tau$.

⑦ The nine echos of the synchronization pattern sent before the phase shift are sampled in a period between the tenth to eighteenth receiving clocks. A residual echo signal appears because of the phase shift. The residual echo signal is cancelled by rewriting the correction value by a small value, for each frame transmission. Through duplex communication, a correction value $Xi$ which permits sufficient cancellation of the residual echo signal is determined based on information of several hundreds of times of phase shifts, and it is stored in a compensation table. At this moment, the training ends.

⑧ As the synchronization shifts, the phase shift is done at the frequency division ratio of $1/(A+1)$ after the synchronization pattern has been sent.

9. Since the phase is retarded by $\Delta\tau$, the echo of the synchronization pattern is detected in a different value in comparison with that when no phase shift is included. Accordingly, the echo cancelling signal is set to $-Xi+Yi$ to cancel the echo only a period between the 10th to 18th receiving clocks. Thereafter, the echo is cancelled only by $Yi$.

⑩ As the synchronization shifts, the phase shift is adjusted at the frequency division ratio of $1/(A-1)$.

⑪ Since the phase is advanced by $\Delta\tau$, the echo of the synchronization pattern has a different value in comparison with that when no phase shift is included. In this case, the echo cancelling signal is set to $+Xi+Yi$ and the echo is cancelled only for the period between the 10th and 18th receiving clocks, and thereafter the echo is cancelled only by $Yi$.

In the above description, it is assumed that the amount of phase shift is small. In case of large phase shift, new correction value $Zi$ is required for cancel the residual echo signal not cancelled only by the correction value $Xi$. Since the output of $Zi$ is activated between the 9th to 18th receiving clocks as $Xi$ is activated, 9 memories are required. Accordingly, 18 memories are required for $Zi$ and $Xi$ in this case. As seen from the above, the number of memory elements used for the correction of the NT quasi-echo signal is the same or as double as the number of clocks in the compensation period, which is a small number such as 9 or 18. Thus, the echo can be effectively cancelled with a small amount of hardware. The adaptive filter and the phase shift compensation table operate independently, and the convergence by the phase shift compensation table is effected to assist the convergence of the echo by the adaptive filter. Accordingly, the convergence time of the echo is reduced.

BRIEF DESCRIPTION OF THE DRAWINGS

FIG. 13 shows a configuration of the present invention applied to a full duplex modem.

DESCRIPTION OF THE PREFERRED EMBODIMENTS

One embodiment of the present invention is now explained with reference to the drawings. Transmission signals to a line are specified by ANSI (American National Standards Institute) as $\pm 0.833$ V and $\pm 2.5$ V. Those signals are represented by line codes $\pm 1$ and $\pm 3$, where $+1$ indicates $+0.833$ V, $-1$ indicates $-0.833$ V, $+3$ indicates $+2.5$ V and $-3$ indicates $-2.5$ V.

Figure 1:
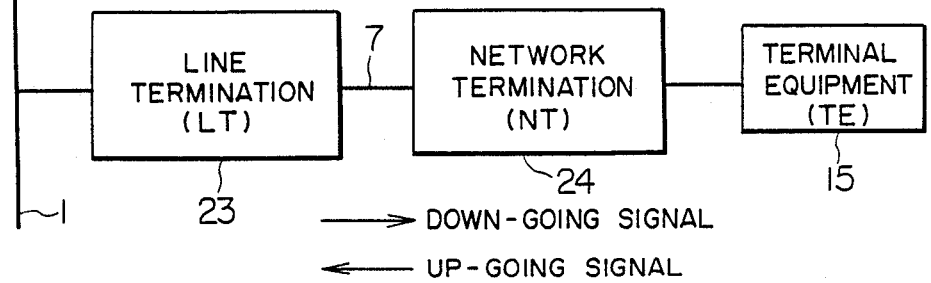
FIG. 1 shows an overall configuration of a digital subscriber transmitter to which the present invention is applied.

FIG. 1 shows a configuration of a subscriber line digital transmitter. It comprises two units, a line termination (LT) 23 at a switching station and a network termination (NT) 24 at a terminal.

Figure 2:
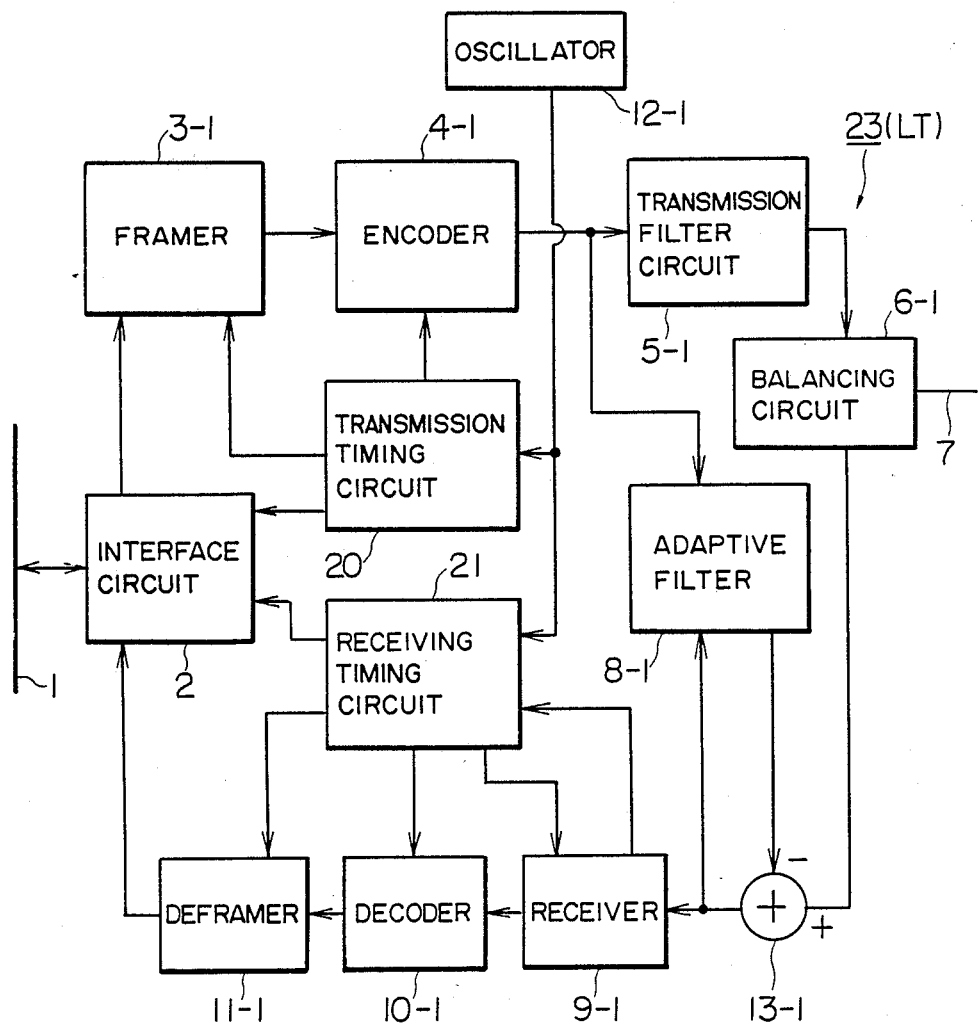
FIG. 2 shows a block diagram of a line termination.

As shown in FIG. 2, the LT 23 comprises an interface circuit 2 which exchanges transmission data with a network 1, a framer 3-1 which converts the transmission data to a frame format which is a predetermined communication unit, an encoder 4-1 for converting the framed transmission data to a line code such as 2B1Q or 4B3T, a transmission filter circuit 5-1 for eliminating a high-frequency signal component contained in the line code in order to prevent EMI fault, a balancing circuit 6-1 for separating a signal (down-going signal) transmitted from the LT 23 to the NT 24 and a signal (upgoing signal) transmitted from the NT 24 to LT 23, an adaptive filter 8-1 for cancelling go-round of the up-going signal to the down-going signal caused by impedance mismatching between the balancing circuit 6-1 and the line 7, an adder 13-1, a receiver 9-1 for identifying a voltage level of the data by eluminating the intersymbol interference due to the frequency characteristic of the line 7, a decoder 10-1 for decoding the identified data to corresponding binary data, a deframer 11-1 for deframing the decoded signal for each channel in accordance with the frame format, and prepares data to be transmitted to the network 1, an oscillator 12-1 for supplying a system clock to the switching station, an LT transmission timing circuit 20 for frequency-dividing the system clock to supply an operation clock to the interface circuit 2, the framer 3-1 and the encoder 4-1, and an LT receiving timing circuit 21 for extracting phase information from the up-going signal to generate an operation clock having a phase difference from the operation clock generated by the LT transmission timing circuit 20 detected by postcursor and precursor and supply it to the adaptive filter 8-1, the receiver 9-1, the decoder 10-1, the deframer 11-1 and the interface circuit 2.

Figure 3:
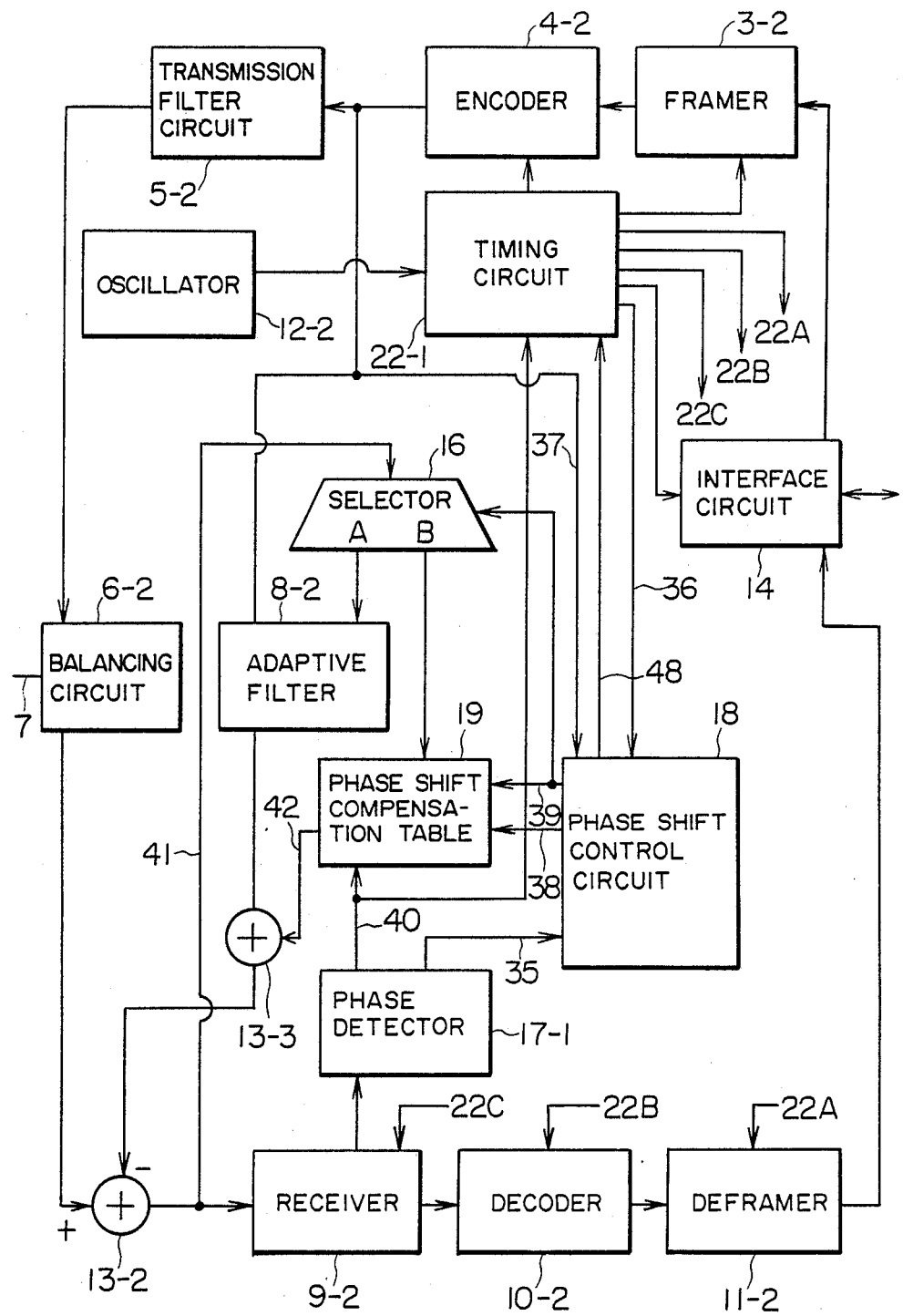
FIG. 3 shows a block diagram of a network termination.

As shown in FIG. 3, the NT 24 comprises an I/0 circuit 14 for exchanging data with a terminal equipment (TE) 15, a framer 3-2, an encoder 4-2, a transmission filter circuit 5-2, a balancing circuit 6-2, an adaptive filter 8-2, a receiver 9-2, a decoder 10-2, a deframer 11-2, an adder 13-2, which are identical to those of the LT 23, a phase detector 17 for extracting a phase which assures a maximum amplitude point of the down-going signal and producing a phase control request signal and a phase shift direction signal, a phase shift control circuit 18 for supplying an activation signal and an address signal of a memory at which a correction value is stored to the phase shift compensation table 19 and a phase control signal to the timing circuit 22 based on the phase control request signal, the transmission data train and the NT transmission clock, the phase shift compensation table for producing an quasi-echo signal correction value based on the activation signal, address signal, phase shift direction signal and residual echo signal, an adder 13-3 for adding the quasi-echo signal correction value to the output of the adaptive filter 8-2, an oscillator 12-2 for supplying a master clock to the NT 24, and a timing circuit 22 for frequency-dividing the NT master clock at a frequency division ratio determined by the phase control signal and the phase shift direction signal to supply an operation clock synchronized with the down-going signal to the I/0 circuit 14, framer 3-2, encoder 4-2, adaptive filter 8-2, receiver 9-2, decoder 10-2, deframer 11-2 and phase shift control circuit 18.

The operation in the data transmission from the LT 23 to the NT 24 (down-going signal transmission) is explained.

In the LT 23, the transmission data received from the network 1 through the interface circuit 2 is framed, code-converted and the high-frequency signal component is removed by the framer 3-1, the encoder 4-1 and the transmission filter 5-1, and it is sent to the line 7 in accordance with the LT transmission clock supplied by the LT transmission timing circuit 20. The down-going signal is deformed at the input point of the NT 24 due to the $\sqrt{f}$ attenuation characteristic of the line 7 and hence it includes an intersymbol interference component which overlaps with the signal sent at the next timing.

In the balancing circuit 6-2, because of imperfect separation of the up-going signal and the down-going signal, an echo signal component appears so that a portion of the up-going signal goes around the down-going signal. This is caused by the fact that the diameter and length of the line differ from subscriber to subscriber and has different impedance characteristic from others and hence the balancing circuit 6-2 cannot attain sufficient impedance matching. As a result at the input point of the NT 24, the down-going signal includes the intersymbol interference component and the noise component, that is, the echo signal component. From the down-going signal which includes the noise component, the echo signal component in the down-going signal is eliminated by adding the output of the adaptive filter 8-2 and the output of the phase shift compensation table by the adder 13-3 and adding the output of the adder 13-3 and the down-going signal by the adder 13-2. The receiver 9-2 eliminates the intersymbol interference component and identify the code as to the voltage of the data. The code identification is done at the rising timing of the NT receiving clock supplied from the NT timing circuit 22-1. The phase of the rising timing of the NT receiving clock is controlled by the PLL such that the amplitude of the code of the down-going signal is maximum at that timing. The eye-open is assured and the optimum phase is detected.

Figure 4:
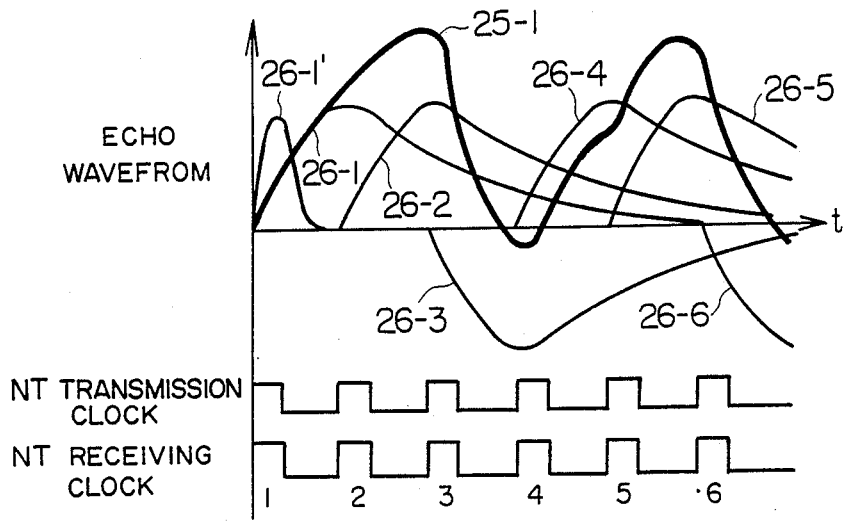
FIG. 4 illustrates an echo signal.

The generation of the quasi-echo signal is now explained. FIG. 4 shows echo signal detected at the input of the NT. In the illustrated example, the transmitted data from NT are +1, +1, −1, +1, +1 and −1. An abscissa in FIG. 4 represents a time, and an ordinate represents a voltage. The NT transmission clock representing the transmission timing and the NT receiving clock representing the receiving timing are shown along the time axis. The transmission is done in synchronism with the rise of the transmission clock. When the transmission data 26-1' (+1) is transmitted as an up-going signal by the first transmission clock 1, it is reflected because of impedance mismatch with the line so that a deformed waveform 26-1 goes into the identification channel of the down-going signal. Other transmission data following to 26-1' (+1, −1, +1, +1, −1) are not shown, and the waveforms 26-1 to 26-6 represent echo signals corresponding to the transmitted data from the NT. A combined echo signal 25-1 is a linear sum of the waveforms 26-1 to 26-6. The combined echo signal $E_r(i)$ at the i-th sampling point is represented by $$E_r(i) = \sum_{k=-\infty}^{i} a_k \cdot r((i-k)T + \tau_0) \tag{1}$$

where k is an integer, $r((i-k)T+\tau_0)$ represents an echo impulse response signal at a point $(i-k)\times T+\tau_0$, $a_k$ is a transmission data train, T is a sample timing interval, and $\tau_0$ is a phase difference between the NT transmission timing and the NT receiving timing.

Figure 5:
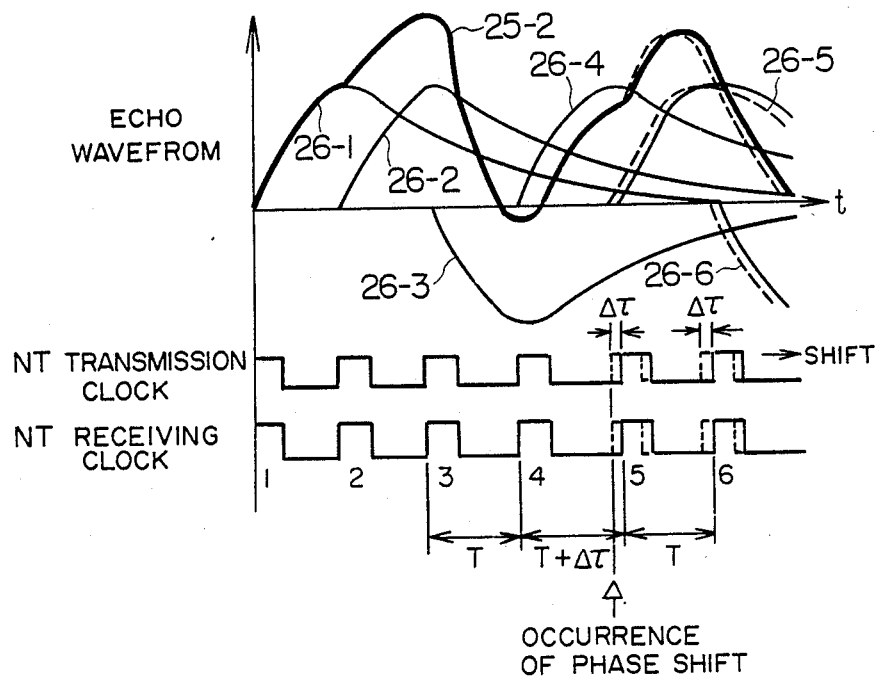
FIG. 5 shows an echo signal where phase shift is included.

FIG. 5 shows echo signals produced when the NT transmission timing and the NT receiving timing are phase-shifted by $\Delta\tau$ by the phase control by the PLL, where $\Delta\tau$ is a difference between clock periods having different frequency division ratio. As an example, when the fifth code +1 is transmitted, the phase is shifted in the retardation direction. Since the first to fourth transmission codes (+1, +1, −1, +1) are not affected by the phase shift, the echo components 26-1 to 26-4 and the combined echo signal 25-2 are of the same waveform as those shown in FIG. 4. However, when the delay $\Delta\tau$ occurs at the transmission of the fifth and subsequent codes +1 and −1, the echo signals 26-5 and 26-6 which should be those shown by broken lines are shifted as shown by solid lines. As a result of the phase shift, the sampling interval of the echo signal 26-2 of the data transmitted at the transmission clock 2 is equal to T for the period of the receiving clocks 1 to 4, but it is $T+\Delta\tau$ for the period between the clocks 4 and 5. After the clock 5, the frequency division ratio again returns to the original one and the period becomes T. When the echo signal is viewed from the sampling point after the clock 5, it is observed as if the echo signal by the first to fourth transmission codes were sent $\Delta\tau$ earlier. The echo signal $E_r(i)$ at the receiving point i when the phase shift occurs at the j-th code transmission which is earlier than the i-th code is represented by $$E_r(i) = \sum_{k=-\infty}^{j-1} a_k \cdot r((i-k)T + \tau_0 + \Delta\tau) + \sum_{k=j}^{i} a_k \cdot r((i-k)T + \tau_0) \tag{2}$$

The first term of the right side reflects the influence by the phase shift $\Delta\tau$. In case of $\Delta\tau/T \ll 1$, the above formula (2) is rewritten as follows.

$$r((i-k)T + \tau_0 + \Delta\tau) = r((i-k)T + \tau_0) + \epsilon((i-k)T + \tau_0) \quad (3)$$

where $\epsilon((i-k)T+\tau_0)$ represents an error signal $e=r(t)-r(t+\Delta\tau)$ caused by a sampling timing error $\Delta\tau$ at a point $t=((i-k)T+\tau_0)$ of an echo impulse response signal $r(t)$. Accordingly, the formula (2) is expressed as follows.

$$E_r(i) = \sum_{k=-\infty}^{i} a_k \cdot r((i-k)T^* + \tau_0) + \sum_{k=-\infty}^{j-1} a_k \cdot \epsilon((i-k)T + \tau_0) \quad (4)$$

In order to cancel the echo signal of the formula (4) by summation, the echo canceller produces an echo cancellation signal $e'(i)$ shown in a formula (5).

$$e'(i) = \sum_{k=i-N+1}^{i} a_k \cdot r'(i-k+1) + \sum_{k=i-M}^{j-1} a_k \cdot \epsilon'(i-k+1) \quad (5)$$

where $r'(x)$ represents an echo impulse response signal sampled at a sampling interval T with reference to a point spaced from the NT transmission timing by a phase difference between the transmission clock and the receiving clock, $\epsilon'(x)$ represents a deviation of the echo inpulse response due to the phase shift $\Delta\tau$, and M and N represent numbers of sampling points necessary to attain desired echo cancellation characteristic.

On the other hand, when the phase shift $\Delta\tau$ is large, the residual echo signal differs depending on whether the phase shift is in the advance direction or retardation direction as shown below. The formula (3) is rewritten as $$r((i-k)T + \tau_0 \pm \Delta\tau) - r((i-k)T + \tau_0) = \quad (6)$$
$$h((i-k), \pm\Delta\tau) + j((i-k), \pm\Delta\tau)$$

An odd function term of $$\{r((i-k)T + \tau_0 \pm \Delta\tau) - r((i-k)T + \tau_0)\}$$

which is a function of $\Delta\tau$ is defined as $h((i-k), \Delta\tau)$ and an odd function term is defined as $j((i-k), \Delta\tau)$. Thus, the formula (6) is rewritten as $$r((i-k)T + \tau_0 \pm \Delta\tau) - r((i-k)T + \tau_0) = \quad (7)$$
$$\pm h((i-k), \Delta\tau) + j((i-k), \Delta\tau)$$

In the formula (7), $h((i-k), \Delta\tau)$ and $j((i-k), \Delta\tau)$ are defined as follows.

$$h((i-k), \Delta\tau) = \tfrac{1}{2} r((i-k)T + \tau_0 + \Delta\tau) - \quad (8)$$
$$r((i-k)T + \tau_0 - \Delta\tau)\}$$

$$j((i-k), \Delta\tau) = \tfrac{1}{2} r((i-k)T + \tau_0 + \Delta\tau) + \quad (9)$$
$$r((i-k)T + \tau_0 - \Delta\tau) - 2r((i-k)T + \tau_0)\}$$

The formula (5) is rewritten as follows by using the formula (7).

$$e'(i) = \sum_{k=i-(N+1)}^{i} a_k \cdot r'(i-k+1) + \sum_{k=i-M}^{j-1} a_k \{(\pm h'(i-k+1) + j'(i-k+1)\} \quad (10)$$

where $h'(x)$ and $j'(x)$ represent differences between the echo impulse response signal t same sampling point and the sampling points spaced therefrom by $\pm\Delta\tau$. When the phase is shifted by $+\Delta\tau$, the difference is $h'(x)+j'(x)$, and when the phase is shifted by $-\Delta\tau$, the difference is $-h'(x)+j'(x)$. Accordingly, as seen from the formulas (8), (9) and (10), if the phase shift $\Delta\tau$ is sufficiently small, the following approximation may be made.

$$\begin{cases} h'(x) \approx \epsilon'(x) \\ j'(x) \approx 0 \end{cases} \quad (11)$$

If the phase shift $\Delta\tau$ is large, $j'(x) \neq 0$ and hence the correction is necessary by adding $j'(x)$.

Assuming that the phase shift occurs at a point l, if the transmission data train $a_k$ from a point l-M to a point l-1 is known, the correction value is represented as follows.

$$\sum_{k=i-M}^{l-1} a_k (\pm h'(i-k+1)) + \sum_{k=i-M}^{l-1} a_k \cdot j'(i-k+1) = \quad (12)$$
$$P \cdot H(i-l+1) + J(i-l+1)$$

where $H(x)$ and $J(x)$ are defined between $2 \leq X \leq M+1$ and correspond to the first and second terms of the left side of the formula (12), respectively. The odd function $H(x)$ is linear approximation of correction value for the phase shift based on a gradient of a tangential line of an echo waveform, and the even function $J(x)$ is an error of the linear approximation. P is $+1$ when the phase shift is in the advance direction, and $-1$ when it is in the retard direction. In the present invention, when the phase shift $\Delta\tau$ is sufficiently small, $J(x) \approx 0$ in accordance with the formula (11) and only the first term of the right side of the formula (12) is outputted.

On the other hand, when the phase shift $\Delta\tau$ is large, the phase shift compensation table responds to the activation signal to output the correction value for the echo cancellation signal due to the phase control, as the right side component of the formula (12), including $J(x)$.

The phase shift compensation table has two memory areas having $H(x)$ and $J(x)$ ($2 \leq x \leq M+1$) at each sampling point. The correction value for the echo cancellation signal is a sum of the data $H(x)$ stored in one memory area with a sign added in accordance with the phase shift direction signal, and the data $J(x)$ stored in the other memory area.

In accordance with the present invention, the phase shift control circuit detects the specific transmission data train, and the phase control is effected by simultaneously controlling the phase shift compensation table and the variable frequency divider. Thus, the correction value for the echo cancellation signal due to the phase shift, which is the second term of the formula (5) representing the echo signal can be outputted by merely adding the sign to the value stored in the table. Accordingly, the correction value depends only on the phase shift direction. Thus, the memory capacity (number of data) of the memory required for the phase shift compensation table may be equal to the number of clocks in the compensation period, and hence the memory capacity can be significantly reduced.

The compensation table memory stores the differences between the tap coefficients stored in the adaptive filter and the echo signal after the phase control. In the echo convergence stage at the trainning mode, only the adaptive filter is converged to determine the tap coefficients of the adaptive filter. When the phase control is later effected, the output of the adaptive filter is kept unchanged and the phase shift compensation table is activated for convergence. If the phase shift does not occur, the convergence is effected only by the adaptive filter. In this manner, the convergence operations of the adaptive filter and the phase shift compensation table are independently effected so that the competition in the convergence operation is eliminated and the total convergence time is reduced.

The operations of the functional blocks of the embodiment of the present invention is now described.

The operation of the phase detector 17-1 to determine the optimum phase of the receiving clock is explained.

First, a formula (13) is operated.

$$P = h_0 (\Delta h_{-1} - \Delta h_{+1}) \quad (13)$$

where P is phase information, $h_0$ is a result of identification of the line code of the ± code and the amplitude level (±1 V, ±3 V), $\Delta h_{-1}$ is an intersymbol interference measured one sampling interval ahead, and $\Delta h_{+1}$ is an intersymbol interference measured one sampling interval behind.

In order to eliminate the noise and stabilize the identification result, the high-frequency component contained in the phase information P is eliminated by a low-pass filter and it is ternarized by two thresholds $+\delta$ and $-\delta$. When $P < -\delta$, a control request for the advance direction is issued to the NT receiving timing, and when $P > +\delta$, a control request for the retard direction is issued. When $|P| < \delta$, the current timing is maintained. The threshold $\delta$ is a parameter relating to a jitter characteristic of the operation clock. In the present embodiment, $\delta = x/10$ where x is a code identification distance.

Figures 6, 8:
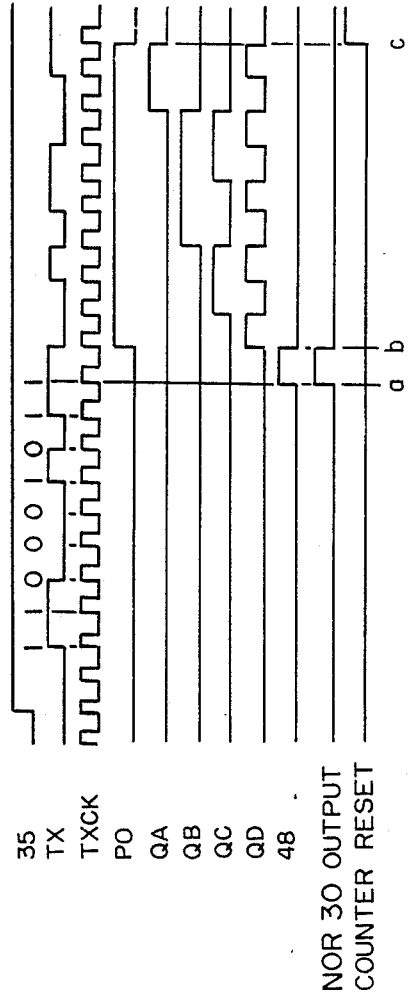
FIG. 6 shows a truth table of a phase detector.
FIG. 8 shows a time chart of the phase shift control circuit of FIG. 7.

FIG. 6 shows a truth table of the activation signal (PO) for the compensation table and the phase shift direction signal (SH) in accordance with the phase control request signal for the respective states.

Figure 7:
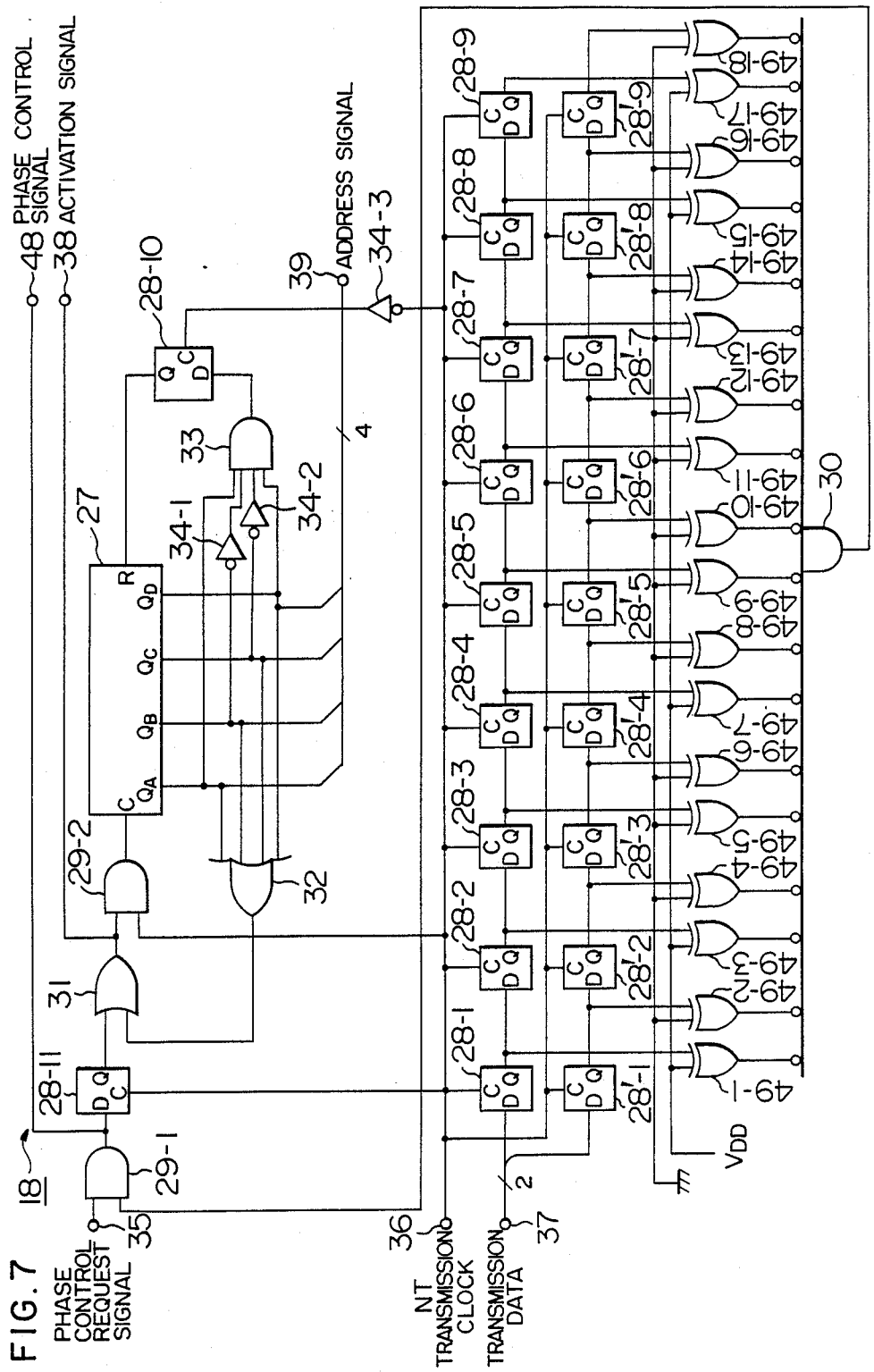
FIG. 7 shows an embodiment of a phase shift control circuit.

The phase control request signal is applied to the phase shift control circuit 18-1. FIG. 7 shows a configuration of the phase shift control circuit 18-1. It is assumed that the specific transmission data train is (1, 1, 0, 0, 0, 1, 0, 1, 1) in time sequence and the phase shift compensation table length (M) is 9. Here, data "1" is represented by binary code (1, 0) and indicates line signal of +2.5 V, data "0" is represented by binary code (0, 0) and indicates line signal of −2.5 V. The M=9 means that the compensation period is equal to 9-receiving clock period. The specific transmission data train is not limited to the above but any combination of codes which can present as data may be used. For example, a frame synchronization pattern which is present in each frame is desirable.

The phase shift control circuit 18 comprises delay circuits 28-1 to 28-11, 28'-1 to 28'-8, EXORs 49-1 to 49-18, a 18-input NOR 30, 2-input ANDs 29-1 and 29-2, a 2-input OR 31, a counter 27, a 4-input OR 32, NOTs 34-1 to 34-3, and a 4-input AND 33. It receives the phase control request signal 35, NT transmission clock (TXCK) 36 and transmission data (TX) 37, and outputs the activation signal (PO) 38 to the phase shift compensation table 19, address signal ($Q_A - Q_D$) 39 and phase control signal 48.

The phase control request signal 35 is applied to the 2-input AND 29-1. The other input of the 2-input AND 29-1 is connected to the output of the 18-input NOR 30. First inputs of the EXORs 49-1 to 49-18 are grounded or connected to $V_{DD}$ in accordance with the specific transmission data train. The output of the 18-input NOR 30 is "1" when the transmission data 37 coincides with the specific transmission data train (Point a in FIG. 8). The coincidence of the transmission data 37 and the specific transmission data train is detected by the delay circuits 28-1 to 28-9, 28'-1 to 28'-8 to which data are transferred at every NT transmission clock 36 and the EXORs 49-1 to 49-18. If the phase control request signal 35 is issued simultaneously with the coincidence of the transmission data 37 and the specific transmission data train, the output of the 2-input AND 29-1 is "1" and the phase control signal 48 is "1". (Point a in FIG. 8). Thus, the frequency division ratio is switched and the phase shift is effected. The phase control signal 48 is delayed by the delay circuit 28-11 until the next transmission timing and the activation signal 38 is rendered "1". At the same timing, the output of the 2-input AND circuit 29-2 also changes to "1" so that the counter 27 counts up to produce the output ($Q_A=0, Q_B=0, Q_C=0, Q_D=1$). As a result, the output of the 4-input OR circuit 32 changes from "0" to "1". (Point b in FIG. 8). When the next NT transmission clock 36 is applied, the output of the delay circuit 28-11 which receives the output of the 18-input NOR 30 becomes "0", but since the output of the four-input OR 32 is "1", the counter 27 counts up. In this manner, each time the NT transmission clock 36 is applied, the counter 27 is incremented by one. When nine NT transmission clocks 36 have been applied, the output of the counter 27 is ($Q_A=1, Q_B=0, Q_C=0, Q_D=1$), and the output of the 4-input AND 33 is "1". $Q_A - Q_D$ is used as an address of the table memory. The output of the 4-input AND 33 is delayed by the delay circuit 28-10 until the next NT transmission timing and it is then supplied to the reset terminal of the counter 27. When the counter 27 is reset (point c in FIG. 8), the output of the 4-input OR 32 changes to "0" and the activation signal 38 also changes to "0". Since the input to the 2-input AND 29-2 also changes to "0", the count-up of the counter 27 is stopped and the counter 27 maintains the output ($Q_A=0, Q_B=0, Q_C=0, Q_D=0$). The above operation is summerized by a time chart shown in FIG. 8.

In FIG. 3, the phase control signal 48 produced by the phase shift control circuit and the phase shift direction signal 40 produced by the phase detector 17 are applied to the clock generator 22 which modifies the frequency division ratio of the variable frequency divider. The frequency division ratio is determined by the center oscillation frequency of the oscillator 12-2 and the frequency of the NT transmission clock. Assuming that the center oscillation frequency of the oscillator 12-2 is 10.24 MHz and the NT transmission clock frequency is 80 KHz, the frequency division ratio is 128. Accordingly, the frequency division ratio of the variable frequency divider is 127 when the phase control signal 48 is "1" and the phase is to be controlled in the advance direction, and 129 when it is to be controlled in the retard direction. On the other hand, in parallel with the phase control, the phase shift compensation table 19 outputs the correction value corresponding to the second term of the formula (5) and it is added to the output of the adaptive filter 8-2 by the adder 13-3 to correct the quasi-echo signal.

Figure 9:
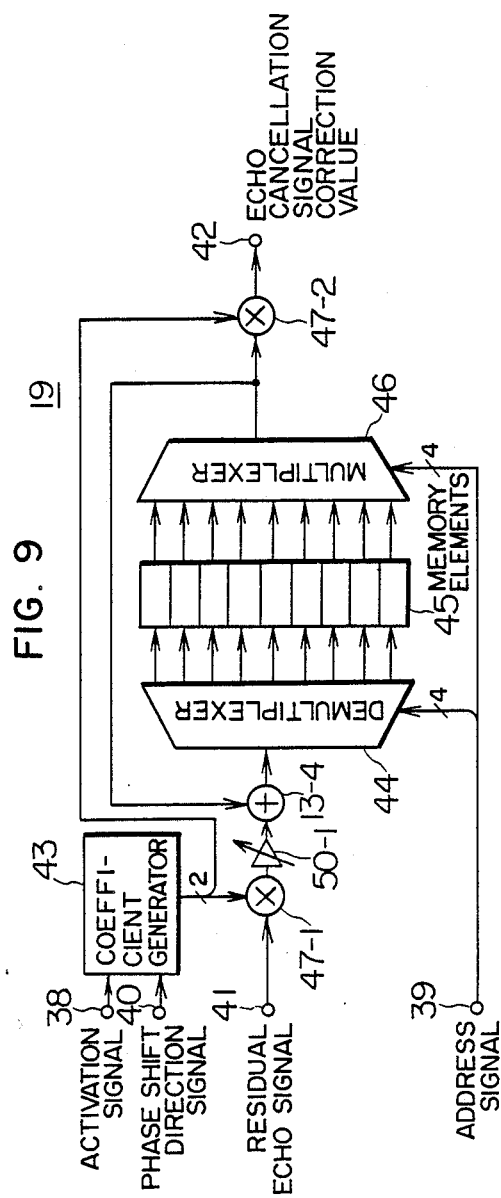
FIG. 9 shows an embodiment of a phase shift compensation table.

FIG. 9 shows a configuration of the phase shift compensation table 19. The phase shift compensation table 19 comprises a coefficient generator 43, multipliers 47-1 and 47-2, an adder 13-4, a demultiplexor 44, a multiplexer 46 and a memory 45. It receives the activation signal 38, address signal 39, residual echo signal 41 and phase shift direction signal 40, and produces an echo cancellation signal correction value 42. The coefficient generator 43 generates the activation signal 38 and a coefficient corresponding to the phase shift direction signal 40. As shown in FIG. 6, it pooduces, in 2-bit expression, "−1" in the advance direction control mode (PO=1, SH=0), "+1" in the retard direction control mode (PO=1, SH=1) and "0" in the no control mode (PO=0). "−1" is represented as "11", "+1" is represented as "01" and "0" is represented as "00", and they are supplied as a control signal to the multiplier. The multiplexer 46 selects the memory element 45 corresponding to the address signal 39, multiplies it by the above coefficient and produces the product as the quasi-echo signal correction value 42. The quasi-echo signal corrected by the quasi-echo signal correction value is added to the down-going signal by the adder 13-2 to eliminate the echo signal component. The residual echo signal 41 which is the output of the adder 13-2 is appropriately amplified and it is applied by the selector 16 to the phase shift compensation table 19 through the output B when PO=1, and to the adaptive filter 8-2 through the output A when PO=0. When PO=0, a normal adaptive feedback operation is conducted, and the explanation thereof is omitted. The operation when PO=1 is explained below.

In FIG. 9, the residual echo signal 41 applied to the phase shift compensation table 19 is multiplied by the coefficient generated by the coefficient generator 43. The product is multiplied by a weighting coefficient determined by the convergence time constant by a weighting coefficient generator 50-1, and the output thereof is added to the output of the memory element 45 corresponding to the address signal by the adder 13-4. The output thereof is stored into the memory element of the same address through the demultiplexer 44. The address signal 39 is the output ($Q_A$, $Q_B$, $Q_C$, $Q_D$) of the counter 27 of the phase shift control circuit 18. It is "1" at the start of the phase control (point b in FIG. 8) and it is sequentially incremented and ends with "9" which indicates the end of the compensation period.

Through the adaptive feedback due to the phase control, the correction value corresponding to the second term of the formula (5) is stored in the memory element. The correction value $X_{i-p}^n$ obtained after the n-th training is $$X_{i-p}^n = X_{i-p}^{n-1} + \omega \cdot a \cdot (E_i - Y_i - X_{i-p}^{n-1}) \ (P \leq i \leq P+8)$$

where the phase shift is carried out at time P, and the values obtained at time i after the time P ($i \leq P+8$) are defined as follows. Ei is the echo signal, Yi is the adaptive filter output, $X_{i-p}^{n-1}$ is the compensation table content after the (n−1)th training, ω is the weighting coefficient and a is the output of the coefficient generator 43.

The down-going signal having the echo signal component eliminated is supplied to the receiver 9-2 which eliminates the intersymbol interference component and identifies the code. The decoder 10-2 and the deframer 11-2 decodes and separates the transmitted data, and it is transmitted to the terminal equipment 15 through the I/O circuit 14.

On the other hand, the up-going signal transmitted from the NT 24 to the LT 23 is sent to the line 7 through the framer 3-2, encoder 4-2, transmission filter circuit 5-2 and balancing circuit 6-2. At the input point of the LT 23, the up-going signal includes the echo signal component and the intersymbol interference component, as the down-going signal does. Unlike the NT 24, the LT 23 can eliminate the echo signal component by only the adaptive filter 8-1, because the frequency synchronization is attained between the up-going signal and the master clock of the oscillator 12-1 and hence the phase control is not necessary unlike the NT 24. The intersymbol interference component contained in the up-going signal is eliminated by the receiver 9-1. However, the code identification of the received signal is done by the phase detection algorithm shown in the formula (13) to control the LT receiving timing circuit so that the sampling is done at the maximum amplitude point.

The code identified by the receiver 9-1 is supplied to the decoder 10-1 and the deframer 11-1 which decode and separate the data to be transmitted to the network 1, and it is transmitted to the network 1 through the interface circuit 2.

Figure 10:
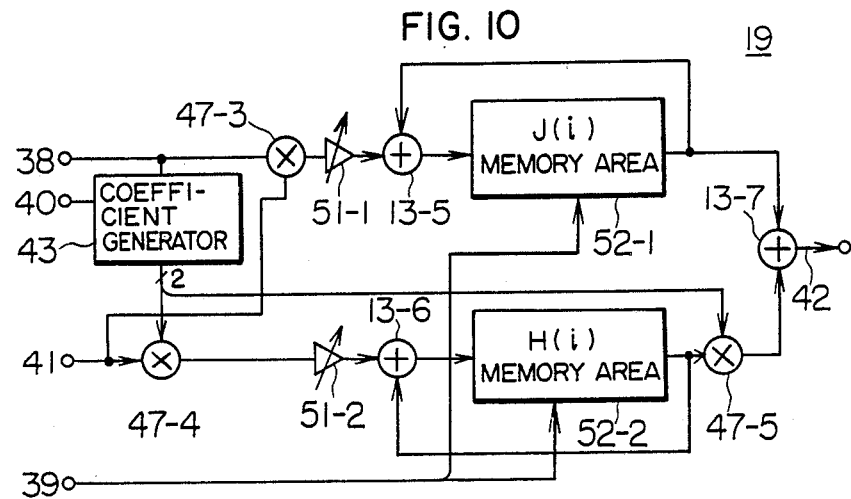
FIG. 10 shows another embodiment of the phase shift compensation table.

FIG. 10 shows another configuration of the phase shift compensation table 19. In the present embodiment, the phase shift compensation table 19 comprises a coefficient generator 43, multipliers 47-3 to 47-5, adders 13-5 to 13-7, memory areas 52-1 and 52-2, and controlable weighting coefficients 51-1 and 51-2. It receives the activation signal (PO) 38, phase shift direction signal (SH) 40, residual echo signal 41 and address signal 39, and produces the quasi-echo signal correction value 42. The memory area 52-1 stores the value of the second term J(i) of the formula (12) which is the correction value of the echo signal sampling point when the phase shift is included, and the memory area 52-2 stores the value of the first term H(i) of the formula (12). The H(i) is linear approximation of the correction amount and J(i) corrects the value not corrected by H(i). Those memory areas are selected by the address signal 39. When the phase of the received clock is to be shifted to an optimum position by the phase detector if the phase shift is included, it is corrected by only H(i) if the amount of shift is small, and if the amount of shift is large, it is further corrected by J(i) because it is not perfectly corrected by H(i). The output from the memory area 52-2 is multiplied by the coefficient supplied by the coefficient generator 43. The output thereof is added to the output of the memory area 52-1, and the sum is outputted as the quasi-echo signal correction value 42. It produces H(i)+J(i) when the phase is to be retarded, and −H(i)+J(i) when the phase is to be advanced.

A method for updating the contents of the memory areas 52-1 and 52-2 is now explained. The residual echo signal 41 is multiplied by the coefficient supplied by the coefficient generator 43 by the multiplier 47-4. The output thereof is appropriately amplified by the weighting coefficient 51-2. The output thereof is added to the output from the memory area 52-2 by the adder 13-6, and the output thereof is stored into the memory element of the same address. On the other hand, the residual echo signal 41 is appropriately amplified by the weighting coefficient 51-1. The output thereof is multiplied by the activation signal by the multiplier 47-3. The output thereof is added to the output from the memory area 52-1 by the adder 13-5, and the sum is stored into the memory element of the same address. The above operation follows the timing chart shown in FIG. 8.

Figure 11:
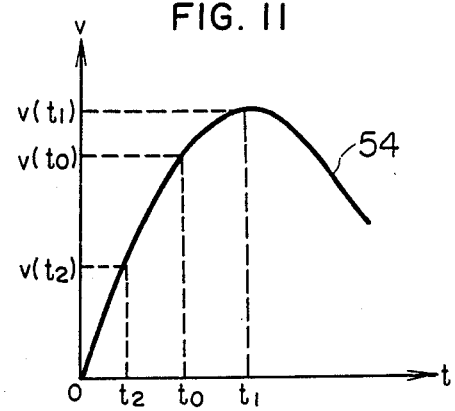
FIG. 11 illustrates a correction value of the echo signal.

The operation in the initial updating of the value stored in the memory area of the phase shift compensation table shown in FIG. 10 is explained. The direction of phase shift greatly depends on a frequency difference between the LT system clock and the NT oscillator, and the phase shift may be greatly deviated to the advance direction or the retard direction. FIG. 11 shows the echo signal 54 detected at the input of the NT, in which an abscissa represents a time and an ordinate represents a voltage. The echo signal is expressed by a function v(t).

It is assumed that the transmission data from the NT as a unit pulse is data comprising single +2.5 V (line code +3) voltage. If the phase has been shifted in the retard direction by the phase control, that is, if the sampling point has been moved to the optimum point (maximum amplitude point) to sample the echo signal, the value corrected by the phase shift compensation table is expressed by $$v(t_1) - v(t_0) = H(i_0) + J(i_0) \quad (14)$$

Similarly, if the phase has been shifted in the advance direction by the phase control, that is, if the sampling point has been moved from $t_0$ to $t_2$, the value corrected by the phase shift compensation table is expressed by $$v(t_2) - v(t_0) = -H(i_0) + j(i_0) \quad (15)$$

By selectively multiplying the residual echo signal by the coefficient supplied from the coefficient generator 43 by the multiplier 47-4, the H(i) can be written into the memory area 52-2. The J(i) represents a difference from the linear approximation. Accordingly, a mean value of the errors rather than correlation with the phase shift direction is to be determined.

Figure 12:
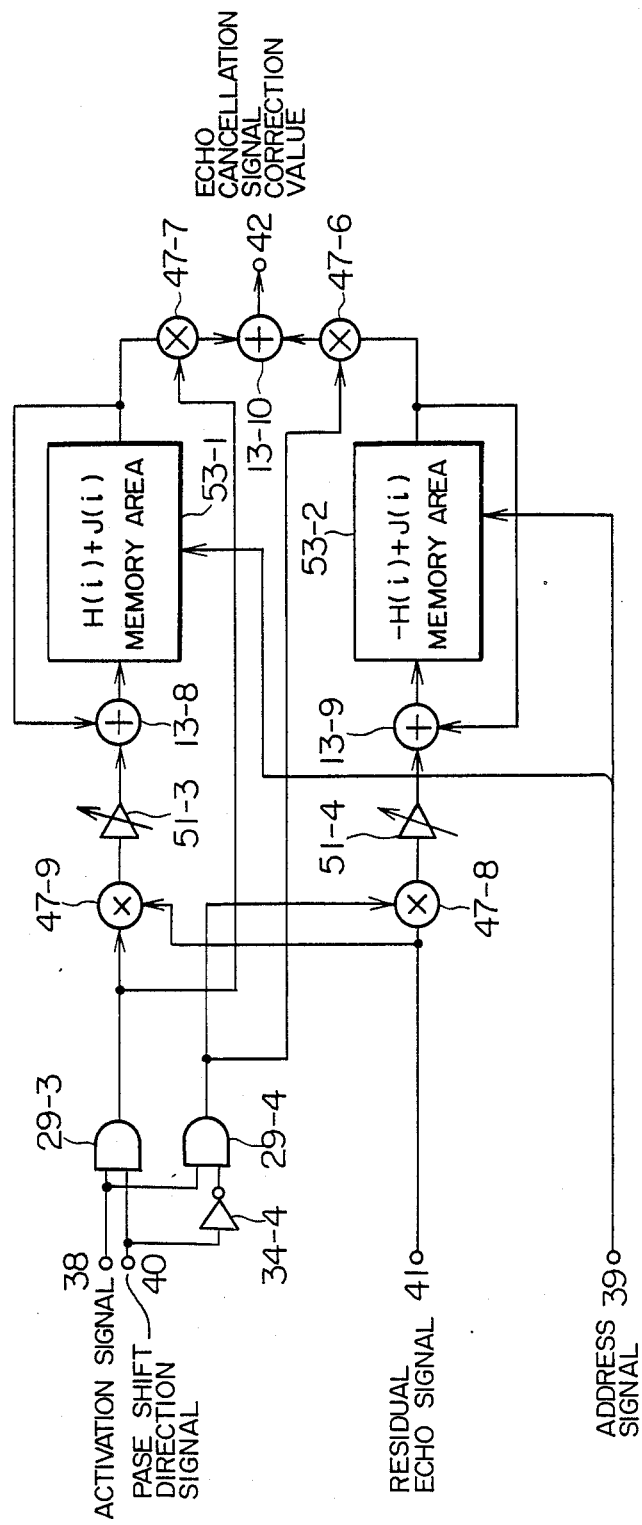
FIG. 12 shows other embodiment of the phase shift compensation table.

FIG. 12 shows other configuration of the phase shift compensation table 19. In the present embodiment, the phase shift compensation table 19 comprises a NOT 34-4, 2-input ANDs 29-3 and 29-4, multipliers 47-6 to 47-9, controllable weighting coefficients 51-3 and 51-4, adders 13-8 to 13-10, and memory areas 53-1 and 53-2. It receives the activation signal (PO) 38, phase shift direction signal (SH) 40, residual echo signal 41 and address signal 39, and outputs the quasi-echo signal correction value 42. When the activation signal (PO) 38 is "1", the phase shift compensation table is activated. If the phase shift direction signal (SH) 40 is "1", "+1" is applied to the multiplier 47-7 and the address signal 39 is applied to the memory area 53-1. The memory area 53-1 stores therein {H(i)+J(i)}. At the memory area 53-1, the memory element corresponding to the address signal is selected and it is outputted as the quasi-echo correction value 42. When the phase shift direction signal (SH) 40 is "0", "+1" is applied to the multiplier 47-6 and the address signal 39 is applied to the memory area 53-2. The memory area 53-2 stores therein {−H(i)+J(i)}. The memory element corresponding to the address signal is selected and it is outputted as the quasi-echo correction value 42. The updating of the data in the memory areas 53-1 and 53-2 is explained. Like in FIG. 10, the quasi-echo signal is corrected by the quasi-echo correction value 42. When the activation signal (PO) is "1", the residual echo signal 41 is applied to the phase shift compensation table 19. When the phase shift direction signal (SH) 40 is "1"0 indicating the retard direction, "1" is applied to the multiplier 47-9, and the residual echo signal 41 is multiplied by the weighting coefficient 51-3. The output thereof is added to the output from the memory area 53-1 by the adder 13-8, and the sum is stored into the memory element of the same address. When the phase shift direction signal (SH) 40 is "0" indicating the advance direction, "+1" is applied to the multiplier 47-8. The output thereof is multiplied by the weighting coefficient 51-4. The output thereof is added to the output from the memory area 53-2 by the adder 13-9 and the sum is stored into the memory element of the same address.

By selecting the memory area by the select signals 29-3 and 29-4 produced in accordance with the phase control signal 38 and the phase shift direction signal 40, {−H(i)+J(i)} and {H(i)+J(i)} can be written into separate areas. Operation results of the formulas {−H(i)+J(i)} and {H(i)+J(i)} are stored in the memory areas.

By applying the adaptive feedback due to the phase control by using the phase shift compensation table shown in FIG. 10 or FIG. 12, the correction value for {±H(i)+J(i)} is produced.

The above timing control compensation function is not limited to the digital subscriber line transmitter but it may also be applied to a full duplex modem which uses a public communication line or two-wire leased line.

FIG. 13 shows an embodiment for the full duplex modem. The full duplex modem comprises an encoder 55 for converting the transmission modem to the line code, a modulator 56 and a demodulator 58 which use the modulation/demodulation system shown in the article 3.2 of "Development of 9600 bps two-wire full duplex modem", Oki Electric Industry Co., Ltd., Technical Report, Study on Oversea Communication N130 (556), an echo canceller 59 constructed as shown in 4.3 of the above article, a receiver 60 for identifying the code, a decoder 61 for decoding the identified code, a phase detector for controlling the identification timing, a phase shift control circuit 18-2, a timing circuit 22-2, an oscillator 12-3, a phase shift compensation table 19-2 for compensating an echo return loss by which the residual echo signal component increases by the identified timing control, a selector 16-2, adders 13-11 and 13-12 and a balancing circuit 57.

The operation of the receiver in the full duplex modem is explained.

When the received signal passes through the balancing circuit 57, it includes the echo signal component because of incomplete separation of the transmission signal and the received signal by the balancing circuit 57. The received signal is demodulated by the demodulator 58. The echo signal component is eliminated from the received signal by adding the output of the echo canceller 59 and the output of the phase shift compensation table 19-2 by the adder 13-12. The receiver 61 eliminates the intersymbol interference component and identifies the code. The identified code is demodulated by the encoder 61. The identification of the code is effected at the receiving timing supplied from the timing circuit 22-2. The transmitting station transmits in synchronism with the receiving timing.

The receiving timing is controlled by the phase detector 17-2, phase shift control circuit 18-2 and timing circuit 22-2 such that the code identification of the down-going signal is effected at the maximum amplitude point of the received signal. The echo return loss due to the timing control can be compensated by the phase shift compensation table 19-2 and the selector 16-2 in the same manner as that of the embodiment of FIG. 3.

On the other hand, the transmitter converts the transmission data to the line code at the timing which the encoder 55 receives from the timing circuit. It is modulated by the modulator 56 and then sent to the line through the balancing circuit 57.

We claim:

1. A method for cancelling an echo in a network termination (NT) of a transmission system, comprising the steps of:
   (a) transmitting a signal from the NT to a line termination (LT), and sampling an echo of the transmitted signal to set tap coefficients of an adaptive filter in the NT;
   (b) requesting a down-going signal from the LT after the tap coefficients of the adaptive filter have been set;
   (c) shifting a phase of a receiving clock with respect to the down-going signal from the LT for synchronization;
   (d) detecting an end of transmission of a specific data train in an up-going signal when the phase of the received clock is to be shifted for synchronization during the transmission of the up-going signal from the NT;
   (e) shifting the phase of the receiving clock when the end of transmission is detected;
   (f) sampling a residual echo signal of the echo of the specific data train not cancelled by the adaptive filter, determining a correction value for the output of the adaptive filter and storing the correction value;
   (g) synchronizing by the steps (d) and (e) when the phase of the receiving clock is to be shifted for synchronization after the correction value has been stored;
   (h) adding a sign corresponding to the direction of the phase shift to the correction value after the phase shift and adding the result to the output of the adaptive filter to cancel the echo of the specific data train; and
   (i) repeating the steps (g) and (h) a predetermined number of times to produce the correction value.

2. A method for cancelling an echo according to claim 1, wherein the step (f) of determining the correction value and storing the correction value includes a step of determining and storing a correction value for the output of the adaptive filter after the k-th transmission of the specific data train as $X_k = X_{k-1} + P \cdot (1/N) \cdot (E - Y - X_{k-1})$, where E is a magnitude of the echo signal sampled after the phase shift of the step (g), Y is a magnitude of the output of the adaptive filter, X is the correction value, N is the predetermined number of times, P is an efficient indicating the direction of phase shift, k is an integer and $1 \leq k \leq N$.

3. A method for cancelling an echo according to claim 2, wherein the step of determining the correction value includes a step of determining a correction value consisting of an odd function term as a linear approximation component and a step of determining a correction value consisting of an even function term to correct an error caused by the linear approximation.

4. A method for cancelling an echo according to any one of claims 1 to 3, wherein the specific data train is a synchronization pattern in a communication frame.

5. A method for cancelling an echo according to any one of claims 1 to 3, wherein the phase shift is effected by varying a frequency division ratio of a master clock supplied from a source of the receiving clock.

6. A method for cancelling an echo according to claim 4, wherein the phase shift is effected by varying a frequency division ratio of a master clock supplied from a source of the receiving clock.

7. An echo canceller in a network termination (NT) of a transmission system comprising:
   (a) means for transmitting a signal from the NT to a line termination (LT) and sampling an echo of the transmitted signal to set tap coefficients of an adaptive filter in the NT;
   (b) means for requesting a down-going signal from the LT after the tap coefficients of the adaptive filter have been set;
   (c) means for shifting a phase of the receiving clock with respect to the down-going signal from the LT for synchronization;
   (d) means for detecting an end of transmission of a specific data train in an up-going signal from the NT when the phase of the receiving clock is to be shifted for synchronization during the transmission of the up-going signal from the NT;
   (e) means for shifting the phase of the receiving clock when the end of transmission is detected;
   (f) means for sampling a residual echo signal of the echo of the specific data train not cancelled by the adaptive filter to determine a correction value for the output of the adaptive filter and store the correction value;
   (g) means for synchronizing by the means (d) and (e) when the phase of the receiving clock is to be shifted for synchronization after the correction value has been stored;
   (h) means for adding a sign corresponding to the direction of phase shift to the correction value; and
   (i) means for adding the correction value having the sign added thereto to the output of the adaptive filter after the phase shift by the means (g) to cancel the echo of the specific data train.

8. An echo canceller according to claim 7, wherein the means for determining the correction value and storing the correction value includes means for counting the number of times of operation of the means (g) to means (i) and means for determining and storing a correction value for the output of the adaptive filter after the k-th transmission of the specific data train as $X_k = X_{k-1} + P \cdot (1/N) \cdot (E - Y - X_{k-1})$, where E is a magnitude of the echo signal sampled after the phase shift by the means (g), Y is a magnitude of the output of the adaptive filter, X is the correction value, N is the predetermined number of times, P is an efficient indicating the direction of phase shift, k is an integer and $1 \leq k \leq N$.

9. An echo canceller according to claim 8, wherein the means for determining the correction value includes means for determining a correction value consisting of an odd function term as a linear approximation component and means for determining a correction value consisting of an even function term to correct an error caused by the linear approximation.

10. An echo canceller according to any one of claims 7 to 9, wherein the means for detecting the transmission of the specific data train includes means for detecting a synchronization pattern in a communication frame.

11. An echo canceller according to any one of claims 7 to 9, wherein the means for shifting the phase includes means for varying a frequency division ratio of a master clock supplied from a source of the receiving clock.

12. An echo canceller according to claim 10, wherein the means for shifting the phase includes means for varying a frequency division ratio of a master clock supplied from a source of the receiving clock.

13. An echo canceller according to any one of claims 7 to 9, further comprising means for modulating the up-going signal and means for demodulating the down-going signal.

14. An echo canceller according to claim 10, further comprising means for modulating the up-going signal and means for demodulating the down-going signal.

15. An echo canceller according to claim 11, further comprising means for modulating the up-going signal and means for demodulating the down-going signal.

16. An echo canceller according to claim 12, further comprising means for modulating the up-going signal and means for demodulating the down-going signal.

17. A transmission system comprising an NT having the echo canceller of any one of claims 7 to 9, and an LT.

18. A transmission system comprising an NT having the echo canceller of claim 10, and an LT.

19. A transmission system comprising an NT having the echo canceller of claim 11, and an LT.

20. A transmission system comprising an NT having the echo canceller of claim 12, and an LT.

21. A transmission system comprising an NT having the echo canceller of claim 13, and an LT.

22. A transmission system comprising an NT having the echo canceller of claim 14, and an LT.

23. A transmission system comprising an NT having the echo canceller of claim 15, and an LT.

24. A transmission system comprising an NT having the echo canceller of claim 16, and an LT.

25. A transmission system comprising an NT having the echo canceller of claim 17, and an LT.

* * * * *